(12) United States Patent
Ganesan et al.

(10) Patent No.: US 8,954,591 B2
(45) Date of Patent: Feb. 10, 2015

(54) RESOURCE NEGOTIATION FOR CLOUD SERVICES USING A MESSAGING AND PRESENCE PROTOCOL

(75) Inventors: Ashok Ganesan, San Jose, CA (US);
Subrata Banerjee, Los Altos, CA (US);
Arpan K. Ghosh, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 443 days.

(21) Appl. No.: 13/041,744

(22) Filed: Mar. 7, 2011

(65) Prior Publication Data

US 2012/0233333 A1    Sep. 13, 2012

(51) Int. Cl.
| G06F 15/16 | (2006.01) |
| H04L 29/08 | (2006.01) |
| H04L 12/24 | (2006.01) |
| H04L 29/06 | (2006.01) |

(52) U.S. Cl.
CPC ............ *H04L 67/24* (2013.01); *H04L 41/5051* (2013.01); *H04L 65/1069* (2013.01); *H04L 41/5096* (2013.01)
USPC ........... 709/227; 709/203; 709/219; 709/220; 709/230

(58) Field of Classification Search
USPC .......................................... 709/203, 227, 228
See application file for complete search history.

(56) References Cited

U.S. PATENT DOCUMENTS

| 6,614,791 | B1 * | 9/2003 | Luciani et al. ............ 370/395.53 |
| 7,574,991 | B2 * | 8/2009 | Kumagai et al. .......... 123/195 C |
| 8,145,719 | B2 * | 3/2012 | Barman et al. ................ 709/206 |
| 8,224,975 | B1 * | 7/2012 | Liu et al. ....................... 709/228 |
| 8,280,978 | B2 * | 10/2012 | Ansari et al. .................. 709/217 |
| 8,281,010 | B2 * | 10/2012 | Ansari et al. .................. 709/225 |
| 8,315,944 | B2 * | 11/2012 | Driemeyer et al. ............. 705/39 |
| 8,326,751 | B2 * | 12/2012 | Driemeyer et al. ............. 705/39 |
| 8,327,005 | B2 * | 12/2012 | Schroeder et al. ............ 709/229 |
| 8,355,333 | B2 * | 1/2013 | Gazier et al. .................. 370/252 |
| 8,369,326 | B2 * | 2/2013 | Ansari et al. .................. 370/389 |
| 8,412,834 | B2 * | 4/2013 | Khasnabish .................. 709/227 |
| 8,422,397 | B2 * | 4/2013 | Ansari et al. .................. 370/254 |
| 8,504,621 | B2 * | 8/2013 | Ruff et al. ..................... 709/206 |

(Continued)

OTHER PUBLICATIONS

XMPP, XEP-0166: Jingle, Scott Ludwig et al., Dec. 23, 2009, (48 pages).

*Primary Examiner* — Michael Y Won
(74) *Attorney, Agent, or Firm* — Edell, Shapiro & Finnan, LLC

(57) ABSTRACT

Techniques are provided for sending from a client in a first network device a first session-initiate message to a second network device that is configured to provide network layer, data link layer, or associated convergence layer based service connection information in order for the second network device to accept or reject a network layer, data link layer, or associated convergence layer based service connection with the first network device. The first session-initiate message is based on a messaging and presence protocol. A session-accept message is received at the client in the first network device that is configured to accept the service connection and provide a network layer, data link layer, or associated convergence layer based service connection information in order for the first network device to establish the service connection with the second network device. The session-accept message is based on the messaging and presence protocol. In response to receiving the session-accept message, the service connection is established.

21 Claims, 4 Drawing Sheets

(56) References Cited

U.S. PATENT DOCUMENTS

| | | | |
|---|---|---|---|
| 2008/0132259 A1* | 6/2008 | Vin | 455/466 |
| 2009/0067441 A1* | 3/2009 | Ansari et al. | 370/401 |
| 2009/0112782 A1* | 4/2009 | Cross et al. | 706/45 |
| 2009/0147772 A1* | 6/2009 | Rao et al. | 370/352 |
| 2010/0169480 A1* | 7/2010 | Pamidiparthi | 709/224 |
| 2011/0138458 A1* | 6/2011 | Kumar et al. | 726/15 |
| 2012/0072499 A1* | 3/2012 | Cipolli et al. | 709/204 |
| 2012/0110185 A1* | 5/2012 | Ganesan et al. | 709/226 |
| 2012/0110186 A1* | 5/2012 | Kapur et al. | 709/226 |
| 2012/0147126 A1* | 6/2012 | Suzuki | 348/14.07 |
| 2012/0233333 A1* | 9/2012 | Ganesan et al. | 709/227 |

* cited by examiner

RESOURCE NEGOTIATION FOR CLOUD SERVICES USING A MESSAGING AND PRESENCE PROTOCOL

TECHNICAL FIELD

The present disclosure relates to network resource allocation and more particularly to automatically configuring services for a network device using a messaging and presence protocol.

BACKGROUND

Instant messaging (IM) has grown from simple messaging in the 1960's, bulletin board systems of the 1980's, and messaging applications of the 1990's, into the field of unified communications, which provides real-time communications services such as unified messaging (integrated email, voicemail, fax, instant messaging, and presence information), telephony, and video conferencing. Enabling many of these IM features are a number of messaging and presence protocols, such as Instant Messaging and Presence Service (IMPS), Extensible Messaging and Presence Protocol (XMPP), and Session Initiation Protocol (SIP) with its extension SIP for Instant Messaging and Presence Leveraging Extensions (SIMPLE), to name a few.

XMPP, also known as "Jabber", is the current Internet Engineering Task Force (IETF) standard for instant messaging and presence. In addition to server-mediated instant messaging, XMPP has been augmented with a signaling mechanism (called "Jingle") to establish unmediated peer-to-peer sessions, such as voice or video sessions. Such peer-to-peer sessions are used to supplement the normal course of instant messaging, e.g., by carrying on a voice conversation in parallel with a text session. The connection that is already established by virtue of XMPP presence can be exploited for peer-to-peer session establishment.

DESCRIPTION OF EXAMPLE EMBODIMENTS

Overview

Figure 1:
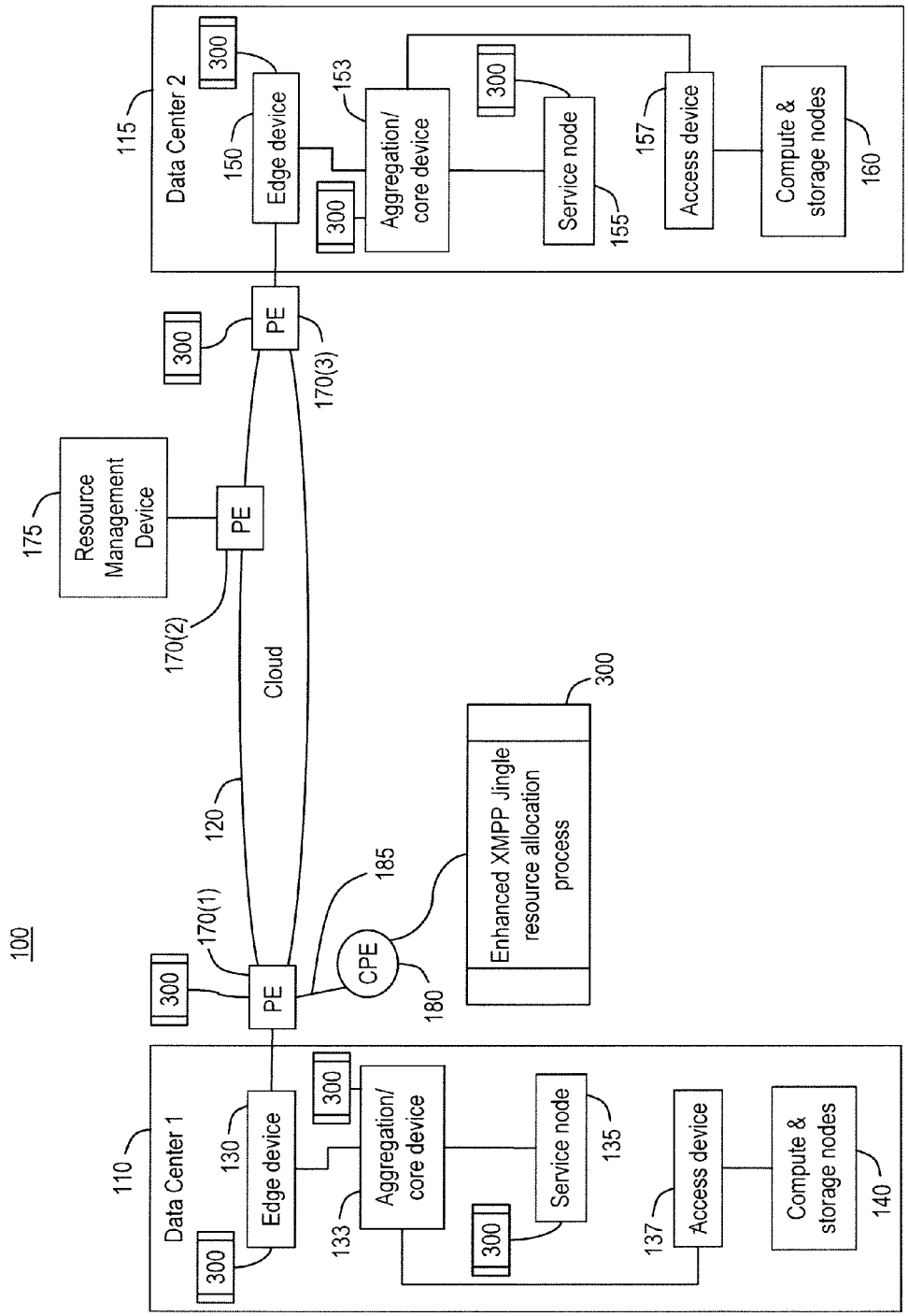
FIG. 1 is a block diagram showing an example of a Wide Area Network (WAN) in which a Customer Premises Equipment (CPE) network device communicates resource request parameters using an Enhanced XMPP Jingle resource allocation process in order to establish a service flow.

Techniques are provided for sending from a client in a first network device a first session-initiate message to a second network device that is configured to provide network layer, data link layer, or associated convergence layer based service connection information in order for the second network device to accept or reject a network layer, data link layer, or associated convergence layer based service connection with the first network device. The first session-initiate message is based on a messaging and presence protocol. A session-accept message is received at the client in the first network device that is configured to accept the service connection and provide a network layer, data link layer, or associated convergence layer based service connection information in order for the first network device to establish the service connection with the second network device. The session-accept message is based on the messaging and presence protocol. In response to receiving the session-accept message, the service connection is established.

For cloud-based Virtual Data Center (VDC) service provisioning, a number of parameters are selected based on the capabilities of the various devices that are involved in VDC instantiation. For example, parameters or attributes such as VLAN numbers, Virtual Private Network (VPN) Routing Forwarding (VRF) names, VPN type, encryption method, tunneling and encapsulation method, Bidirectional Forwarding Detection (BFD)/Unidirectional Link Detection (UDLD) intervals, subnet addresses, Firewall (FW) context, etc., are typically manually selected and configured at the appropriate devices in the network. According to the techniques described herein Jingle can be used to enable automated and independent negotiation of these parameters amongst the respective network devices.

The service is provisioned by automatically establishing a data path between the requester and the service node on a hop by hop basis. The adjacent nodes at each hop exchange data plane parameters to negotiate the setting up of a data path tunnel between them without any manual configuration. Jingle (XEP-0166: http://xmpp.org/extensions/xep-0166.html) is a session management protocol (similar to SIP) typically used for setting up multimedia sessions. For this application, the Jingle framework is modified and used to support sessions for setting up, managing, and tearing down data tunnels that may also be referred to herein as "service connections".

At present, there is no mechanism for leveraging XMPP to establish peer-to-peer service connection sessions for extending VLANs beyond in the virtual data center. One device may need to establish a VLAN connection or receive services from another device in a different data center or a pod within a data center. To establish the VLAN connection in another data center, e.g., a data center providing contracted services, the connection is normally established manually and is subject to configuration errors. By creating a new extension to XMPP Jingle signaling, the existing XMPP mechanisms can be leveraged to establish service connections. The service connection could be a logical connection spanning multiple physical links between two XMPP-capable peers. Traditional Jingle signaling is an extension of XMPP for implementing peer-to-peer session control for multimedia interaction such as voice-over-Internet Protocol (VoIP) or video conferencing. The techniques described herein provide a further extension or modification of XMPP based on Jingle signaling.

Example Embodiments

Referring first to FIG. 1, a system or network 100 is shown. The network 100 comprises two (first and second) data centers 110 and 115 shown in simplified form and without the normally present redundant devices. Each data center 110 and 115 has edge devices 130 and 150, aggregation/core devices 133 and 153, service nodes 135 and 155, access devices 137 and 157, and compute and storage nodes 140 and 160, respectively. Collectively, the edge devices, aggregation/core devices, and access devices regulate access to data center applications, data, and services that may be provided by a network service provider. The service nodes 135 and 155 provide Layer 4 to Layer 7 services for the data center such as firewall services and denial of service attack mitigation. Service nodes 135 and 155 may also provide proxy services for devices that are not configured according to the techniques described herein. Compute and storage nodes 140 and 160 provide the core computational and storage features for the data center, e.g., web or application servers and the associated databases. Other attached storage may be provided in the data centers, e.g., Storage Area Network (SAN) devices that are not illustrated.

Network 100 has a network cloud that supports connections between data centers 110 and 115 by way of, e.g., fiber ring 120. Fiber ring 120 may be part of a Metropolitan Area Network (MAN) or a Wide Area Network (WAN). Alternatively, the fiber ring 120 may represent a mesh network or have a number of non-fiber based connections, e.g., Ethernet links. Fiber ring 120 may employ both optical and electrical components that use optical and electrical standard communications protocols. Attached to the fiber ring 120 are a number of Provider Edge (PE) nodes 170(1)-170(3) that may be operated by one or more service providers. In this example, a service provider operates a resource management device 175 and provides services to a customer's CPE 180. CPE 180 is connected to PE 170(1) by communications link 185. The communications link 185 may be configured to allow CPE 180 to operate within network 100, e.g., using a VLAN in a service provider's VPN.

The CPE 180 is configured to implement an Enhanced XMPP Jingle resource allocation process 300 in order to establish a service flow with a device in data center 110 or datacenter 115 on a hop-by-hop basis. In this regard, each of the network devices within network 100, e.g., edge, PE, aggregation and service devices, may be configured with an XMPP client that is configured with the Enhanced XMPP Jingle resource allocation process 300. This is shown by the reference numeral 300 within a flowchart process symbol. The Enhanced XMPP Jingle resource allocation process 300 may be referred to herein as the Enhanced Jingle process 300 or simply process 300. The Enhanced Jingle process 300 allows a service provider to substantially automate certain aspects of resource management across data centers and within the VPN even when the data centers are operated by different vendors.

In one example, the service provider determines that CPE 180 needs a new service connection. In this example, the resource management device 175 signals CPE 180 and another device in network 100 that a service connection needs to be established, e.g., using a network or resource management application or Extensible Markup Language (XML) via the Simple Object Access Protocol (SOAP). The CPE 180 initiates the Enhanced XMPP Jingle resource allocation process by sending an Enhanced or Extended Jingle SESSION-INITIATE message. If the service connection is accepted, then CPE will receive an Enhanced Jingle SESSION-ACCEPT message. Thus, the Enhanced Jingle signaling provides control plane signaling to set up a data plane connection. The Enhanced XMPP Jingle resource allocation process will be described in greater detail in connection with FIGS. 3 and 4.

Any of the network devices in network 100 may be considered to be in "presence" with each other, e.g., in XMPP presence via their respective XMPP clients. In this regard, the devices in network 100 are alive and aware of each other via XMPP signaling that may be mediated an XMPP server. As a simple example, the devices or nodes in network 100 may advertise or publish their capabilities while other devices subscribe to the published information according to a messaging and presence protocol, i.e., according to a messaging and presence protocol publish-subscribe system. Thus, the edge devices 130 and 150 "know" of the capabilities and processing load of the devices within their respective data centers via a publish-subscribe mechanism. Accordingly, when CPE 180 needs a new service the edge devices 130 and 150 may accept or deny new service requests based on the knowledge of their data center capabilities.

Figure 2:
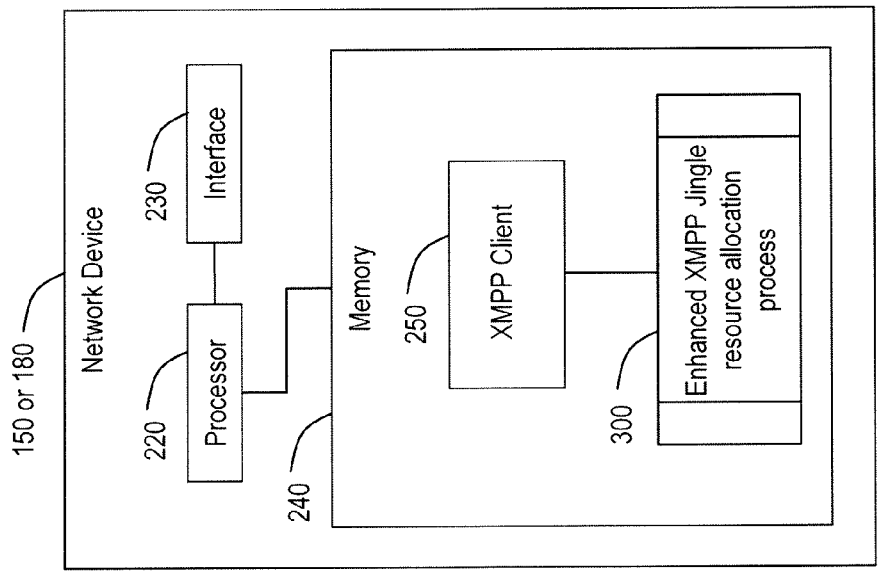
FIG. 2 is a block diagram of a network device configured to execute the Enhanced XMPP Jingle resource allocation process.

Referring now to FIG. 2, a network device, e.g., edge device 150 or CPE 180, is shown (referred to hereinafter as CPE 180). The network device 180 comprises a data processing device 220, an interface unit 230, and a memory 240. Resident in the memory 240 is software configured to execute XMPP client 250 and the Enhanced XMPP Jingle resource allocation process 300. The data processing device 220 may be a microprocessor, a microcontroller, systems on a chip (SOCs), or other fixed or programmable logic. The memory 240 may be any form of random access memory (RAM), FLASH memory, disk storage, or other tangible (non-transitory) memory media device that stores data used for the techniques described herein. The memory 240 may be separate or part of the processor 220. Instructions for performing the process 300 may be stored in the memory 240 for execution by the processor 220 such that when executed by the processor, causes the processor to perform the functions describe herein in connection with FIGS. 3 and 4. The interface unit 230 enables communication between the CPE 180, the PE device 170(1), and ultimately to other network elements including clients, agents, and servers in the system 100. In this regard, interface unit 230 may have a plurality of physical interface or ports. It should be understood that any of the devices in system 100 may be configured with a similar hardware or software configuration as CPE 180.

The functions of the processor 220 may be implemented by a processor readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 240 stores data used for the computations or functions described herein (and/or to store software or processor instructions that are executed to carry out the computations or functions described herein). Thus, functions of the process 300 may be implemented with fixed logic or programmable logic (e.g., software or computer instructions executed by a processor or field programmable gate array (FPGA)).

Figure 3:
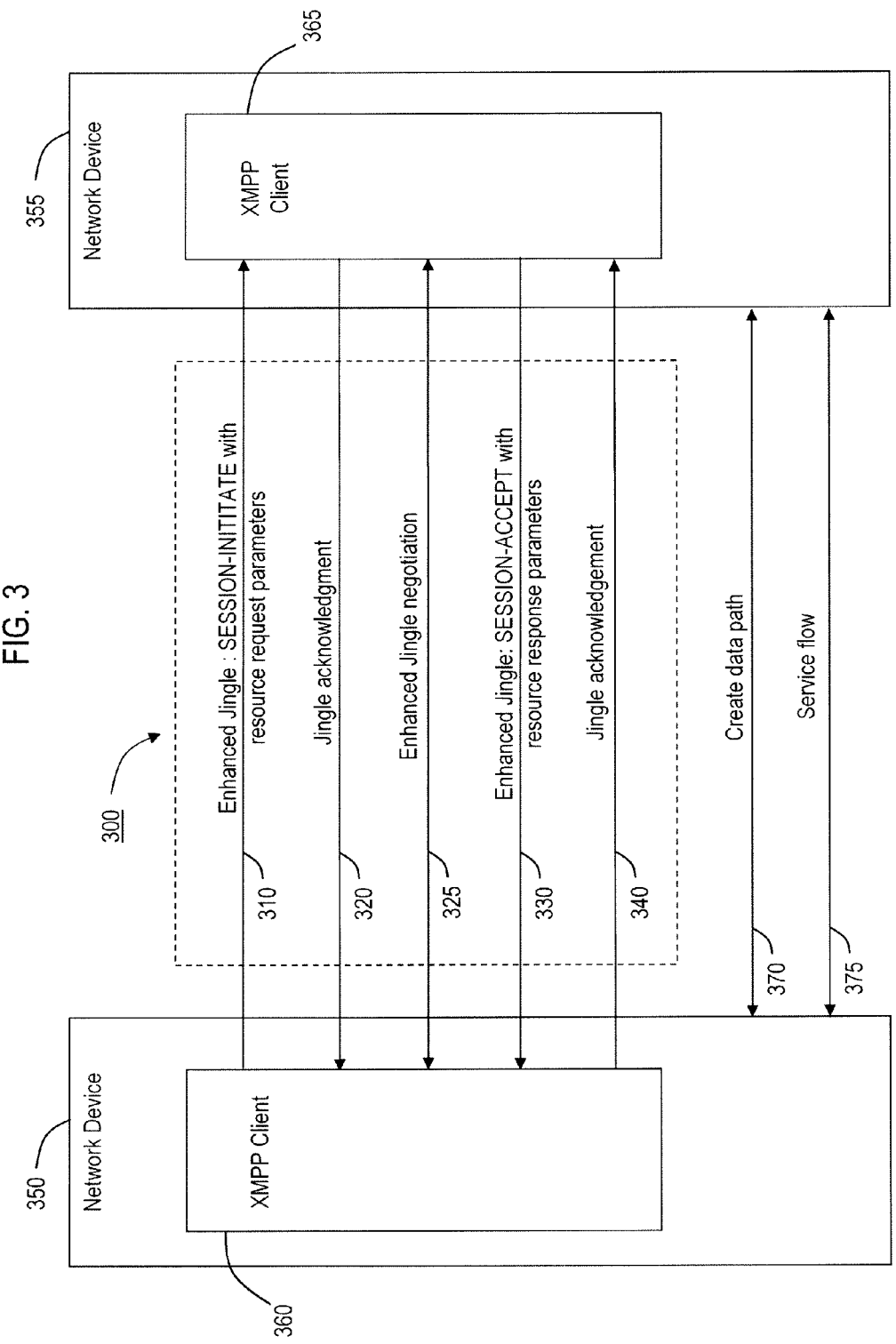
FIG. 3 is a ladder diagram showing an example of two network devices establishing a service flow using the Enhanced XMPP Jingle resource allocation process.

Referring to FIG. 3, Enhanced XMPP Jingle process 300 is described via an exchange of messages between network device 350 and network device 355, and mediated by an XMPP server (not shown). The network device 350 is in secure XMPP presence with network device 355, and desires to establish a service connection 370 with network device 355. In other words, as a precondition to the process of FIG. 3, there is Transport Layer Security (TLS)-server mediated connectivity between the network devices 350 and 355. Briefly, the process 300 starts with sending a modified or Enhanced Jingle SESSION-INITIATE message, i.e., the Enhanced Jingle SESSION-INITIATE message conforms to a modified Jingle extension of XMPP. The Enhanced Jingle SESSION-INITIATE message is followed by receipt of an Enhanced Jingle SESSION-ACCEPT message along with Jingle acknowledgements included for handshaking.

At 310, network device 350 is a session initiator and sends an Enhanced Jingle SESSION-INITIATE message to offer a session to a responder, e.g., network device 355. The Enhanced Jingle SESSION-INITIATE message specifies a session identifier (sid), potential VLANs, and one more connection candidates. An example of Jingle SESSION-INITIATE message is shown in Listing 1 below. Note that prior to sending the Enhanced Jingle SESSION-INITIATE message the network device 350 may generate session keys required for the message and may perform Simple Authentication and Security Layer (SASL) authentication with the XMPP server.

---
Listing 1.
---

```
<iq from='aggregation_node_an1@pod2.datacenter1.atnt.net/nexus_7k'
    id='ph37a419'
    to='service_node_sn1@pod2.datacenter1.atnt.net/fw_v2'
    type='set'>
  <jingle xmlns='urn:xmpp:jingle:1'
          action='session-initiate'
          initiator='aggregation_node_an1@pod2.datacenter1.atnt.net/
          nexus_7k'
          sid='a73sjjvkla37jfea'>
    <content creator='initiator' name='data'>
      <description xmlns='urn:xmpp:jingle:apps:vlan:1' media='data'>
        <payload-type id='0' vlan_number='45'/>
        <payload-type id='1' vlan_number='6'/>
        <payload-type id='2' vlan_number='102'/>
        <payload-type id='3' vlan_number='756'/>
      </description>
      <transport xmlns='urn:xmpp:jingle:transports:ice-udp:1'
                 pwd='asd88fgpdd777uzjYhagZg'
                 ufrag='8hhy'>
        <candidate component='1'
                   foundation='1'
                   generation='0'
                   id='el0747fg11'
                   ip='10.0.1.1'
                   network='1'
                   port='8998'
                   priority='2130706431'
                   protocol='ethernet'
                   type='host'/>
        <candidate component='1'
                   foundation='2'
                   generation='0'
                   id='y3s2b30v3r'
                   ip='192.0.2.3'
                   network='1'
                   port='45664'
                   priority='1694498815'
                   protocol='ethernet'
                   type='srflx'/>
      </transport>
    </content>
  </jingle>
</iq>
```

The SESSION-INITIATE message or stanza in Listing 1 is in XML format. The information/query <iq> start tag and attributes conform to IETF Request for Comments (RFC) 3920. The <jingle>, <content>, <description>, and <transport> start tags conform to the XMPP Extension Protocol (XEP)-0166 (Jingle) format. However, the defined XML namespaces (xmlns) is a demarcation point for the techniques described herein and where the enhanced Jingle extension differs from the Jingle extension (XEP-0166, Jun. 10, 2009). The <content> element has <description> and <transport> elements.

In the XML code sample of Listing 1, the 'id' attribute is set to 'ph37a419' and is used to correlate <iq> requests with responses. There is no particular significance to this choice. Any other string such as '123' or 'abc' could have been used instead. The XMPP Jabber IDs (JIDs) in the 'from', 'to' and 'initiator' attributes in this XML code sample are based on the node@domain/resource format defined in RFC 3920. The 'from' and 'initiator' JIDs in this XML code segment are identical.

In this example, an aggregation node aggregation_node_an1 ("AN1") is adjacent to a service node service_node_sn1 ("SN1") in data center pod #2 and initiates the setup of a data path between them by sending a session-initiate stanza. Sub-elements of the <description> element shown in Listing 1 offer four VLANs numbered 45, 6, 102, and 756 that can be used for the data path. More complex offerings may be made by using layered IEEE 802.1Q VLAN tags provided by the IEEE 802.1ad standard or other mechanism described herein. The IEEE 802.1ad standard enables service provider bridging, stacked VLANs, and the like, and is also known as "QnQ", "QinQ" or "Q-in-Q" to indicate nested or layered VLAN tags, while IEEE 802.1Q may be referred to a "dot1Q".

The <transport> element offers two transport candidates, each of which is enclosed within a <candidate> sub-element. A <candidate> sub-element has component, foundation, generation, and unique candidate identifier (id) attributes. Candidates will have the same foundation if they are similar or are derived from the same type, as indicated in the type attribute. The generation attribute indicates a version number of the specification used for the transport candidate. One of these transport candidates will be accepted by the session responder. The selected unique identifier attributes will be echoed in the Enhanced Jingle SESSION-ACCEPT message. The session responder should accept only one offered transport candidate.

The <candidate> element in this example includes the following additional attributes: IP address (ip), network, UDP port (port), priority, protocol, and type. The IP address, network, and UDP port are unique for each direction of transport. The protocol and type in the transport candidate element constructed and advertised by the session responder in the Enhanced Jingle SESSION-ACCEPT message should be identical to the protocol and type in the initiator-offered transport candidate that is accepted by the session responder. Note that one of the transport candidates offered by the session initiator contains a network assigned (10.x.x.x) IP address, while the other contains a private (192.x.x.x), NAT-translated IP address. A public IP address could also be provided.

Recipients of a Jingle message with multiple candidates may use the priority attribute to evaluate the candidates in the order of their priorities, e.g., a higher priority attribute value has a higher priority. The recipient should accept the highest-priority candidate that the receiver can support. The contents of a candidate sub-element may be extended to include new parameters by using different values of "type" in the candidate stanza.

Referring again to FIG. 3, at 320, the Enhanced Jingle SESSION-INITIATE message is acknowledged by network device 355 using a standard Jingle acknowledgment. At 325, Enhanced Jingle negotiation takes place. The negotiations take place using Jingle action attributes or messaging that is used for overall session management. Some examples include Jingle content-accept, content-reject, transport-accept, transport-replace, transport-reject, and so on. However, these messages may use Enhanced Jingle attributes according to the techniques described herein.

The Enhanced Jingle negotiation can be hierarchical or multi-phased. For example, a first phase may incur negotiating if a dot1Q or QinQ tagging mechanism would be used and a second phase may then involve negotiating a specific VLAN or VLANs, as described below. If dot1Q is accepted during the first phase of negotiation, then the specific VLAN for dot1Q is negotiated during the second phase, i.e., in first pass two end points negotiate between dot1Q and QinQ choices, and then in the second pass specific VLAN parameters for the chosen mechanism, e.g. the dot1Q mechanism, are negotiated. Parameter negotiation may be performed using a Jingle transport-info action attribute.

For example, the Enhanced Jingle SESSION-INITIATE message shown in Listing 1 offers four VLANs 45, 6, 102, and 756, and two transport candidates, as mentioned above. As a simple example, during negotiation the network device 355 may send a message indicating that three of the VLANs, e.g., VLANs 45, 6, 102, and one transport candidate are acceptable or available. At this point, the network device 350, selects one of the three VLANs, e.g., VLAN 6, and sends the selection to the network device 355. Since network device network device 350 originally offered two transport candidates, it automatically accepts the single transport candidate offered.

At 330, if the offer is accepted, network device 355 sends a modified or Enhanced Jingle SESSION-ACCEPT message, i.e., the Enhanced Jingle SESSION-ACCEPT message conforms to a modified Jingle extension of XMPP. An example Enhanced Jingle SESSION-ACCEPT message is shown in Listing 2 below.

Listing 2.

```
<iq from='service_node_sn1@pod2.datacenter1.atnt.net/fw_v2'
    id='yd71f495'
    to='aggregation_node_an1@pod2.datacenter1.atnt.net/nexus_7k'
    type='set'>
  <jingle xmlns='urn:xmpp:jingle:1'
          action='session-accept'
          responder='service_node_sn1@pod2.datacenter1.atnt.net/
          fw_v2'
          sid='a73sjjvkla37jfea'>
    <content creator='initiator' name='data'>
      <description xmlns='urn:xmpp:jingle:apps:vlan:1' media='data'>
        <payload-type id='1' vlan_number='6'/>
      </description>
      <transport xmlns='urn:xmpp:jingle:transports:ice-udp:1'>
        <candidate component='1'
                   foundation='1'
                   generation='0'
                   id='or2ii2syr1'
                   ip='192.0.2.1'
                   network='0'
                   port='3478'
                   priority='2130706431'
                   protocol='ethernet'
                   type='host'/>
      </transport>
    </content>
  </jingle>
</iq>
```

In the XML code sample of Listing 2, the 'id' attribute is set to 'yd71f495' and is used to correlate <iq> requests with responses. There is no particular significance to this choice. Any other string such as '456' or 'xyz' could have been used instead. The 'to' and 'responder' JIDs in this XML code segment correspond to the 'from' and 'initiator' JIDs in Listing 1. The value of the session identifier (sid) is the same as in the SESSION-INITIATE message. Certain values of the attributes in the SESSION-ACCEPT message echo the values in the SESSION-INITIATE message. If there is an error then AN1 rejects the SESSION-ACCEPT offer via a SESSION-TERMINATE message. The SESSION-TERMINATE message operates according to the Jingle standard.

The <description> element shown in Listing 2 indicates that VLAN 6 was accepted as mentioned above. The component, foundation, and generation attributes are set to 1, 1, 0, indicating that the session responder has accepted the transport candidate with an identifier the first transport candidate offered in the SESSION-INITIATE message. The session responder constructs and advertises exactly one transport candidate (<candidate> sub-element). In the XML code sample in Listing 2, this sub-element lists the responder's IP address and port number. The IP address (ip) and port number (port) are set to the address and port at which the responder is prepared to receive data packets from the initiator.

At 340, the Enhanced Jingle SESSION-ACCEPT message is acknowledged by network device 350. Now that the network devices 350 and 355 have each others IP address and port number, and a common VLAN, they can create data path or tunnel 370 and communicate via service flow 375 over the created data path. In this example, SN1 sets up the data tunnel 370 to AN1.

The data path 370 is an Opens Systems Interconnection (OSI) model data link layer (Layer 2) or network layer (Layer 3) connection that may include any surrounding or intermediate convergence layers. For example, Multiprotocol Label Switching (MPLS) is considered by many to be a Layer 2.5 protocol, i.e., a convergence layer between Layer 2 and Layer 3, and as such, data path 370 may be an MPLS tunnel for virtual links between devices or data centers. In this regard, the techniques described herein are different from traditional Jingle which seeks to establish application layer, e.g., Layer 7, sessions via transport mechanisms that are already in place. The data tunnel set up will be described in additional detain in connection with FIG. 4.

Figure 4:
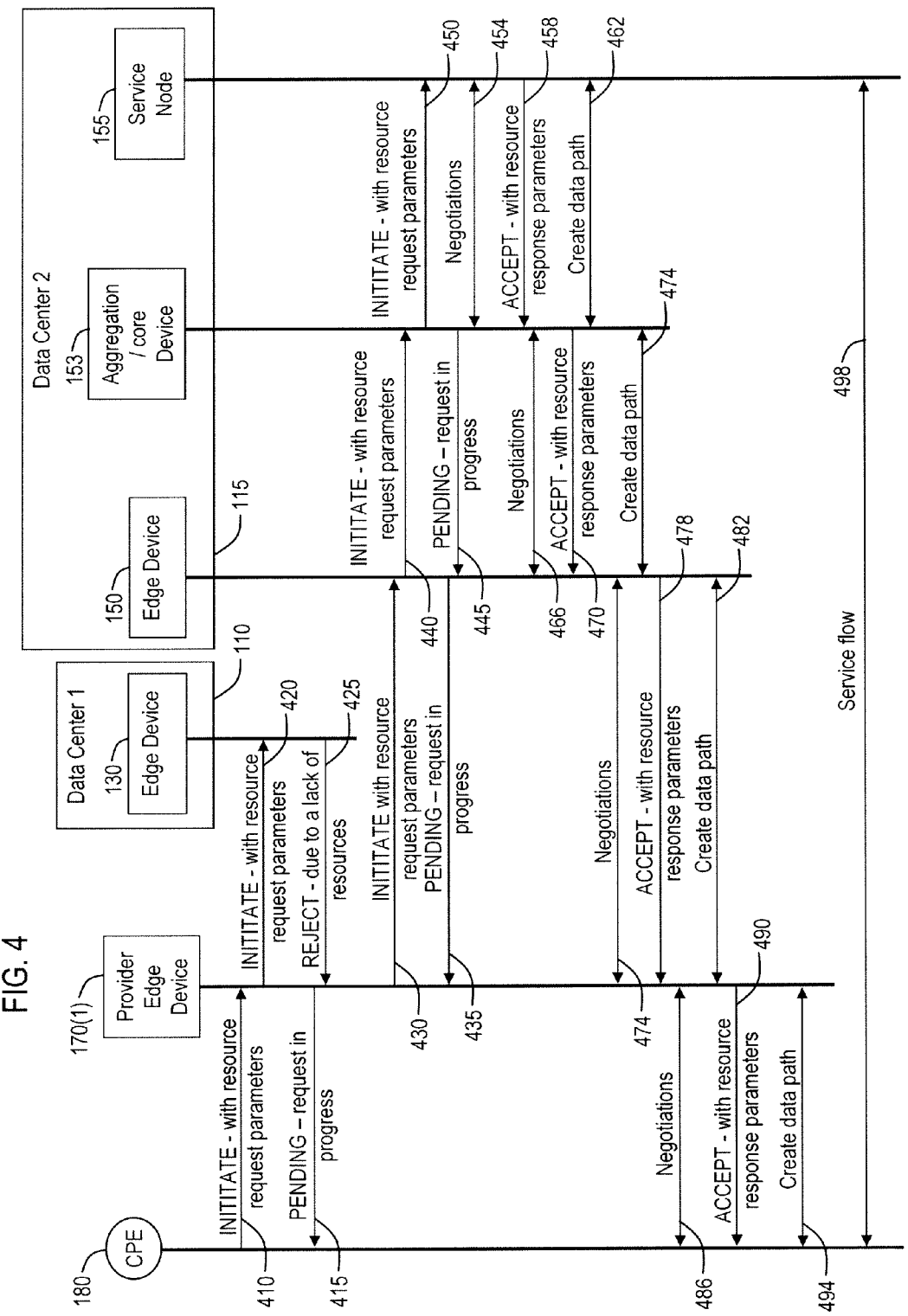
FIG. 4 is a ladder diagram showing an example of two network devices establishing a service flow using Enhanced XMPP Jingle resource allocation process by way of a plurality of intermediate network devices.

Referring now to FIG. 4 with additional reference to FIG. 1, a ladder diagram is shown in which two network devices establish a service flow using Enhanced XMPP Jingle resource allocation process by way of a plurality of intermediate network devices. Enhanced Jingle signaling is provided between the CPE 180, PE 170(1), the edge device 130, the edge device 150, the aggregation/core device 153, and the service node 155 from FIG. 1. In this example, CPE 180 would like to set up a service connection with a service node that can provide the desired service. Each of the devices in FIG. 4 is equipped with some version of Enhanced XMPP Jingle resource allocation process 300.

At 410, CPE 180 sends an Enhanced Jingle SESSION-INITIATE message with resource request parameters to PE 170(1). Example resource request parameters may include a customer ID, connectivity parameters, a number of virtual machines, a number of virtual contexts, a number of firewall contexts, or other parameters. The term "contexts" refers to the partitioning of a service/device, e.g., a firewall device, into multiple virtual devices such that each virtual device is a security or firewall context. At 415, a Jingle acknowledgement is received that indicates that the resource request is "pending" and in progress. At 420, PE 170(1) continues the process by sending an Enhanced Jingle SESSION-INITIATE message with the resource request parameters to edge device 130.

In this example, edge device 130 is aware of the capabilities of data center 110 through a publish-subscribe mechanism. In one example, nodes with messaging and presence capability, or that proxy for nodes without messaging and presence capability, register, authenticate, and advertise their presence via a messaging and presence protocol. Service nodes can create a publish-subscribe nodes on an XMPP server and publish their capability, e.g., a number of firewall instances or contexts that are available at the service node. Nodes that are interested in services can subscribe to the publish-subscribe node. The publish-subscribe node can be "discovered" by the interested node using a protocol provided service discovery mechanism. In this example, edge device 130 determines that data center 110 can not accommodate the resource request, and at 425, sends a Jingle SESSION-REJECT message back to PE 170(1).

Having failed the first connection attempt, at 430, PE 170(1) continues the process by sending an Enhanced Jingle SESSION-INITIATE message with the resource request parameters to edge device 150. Edge device 150 is aware that data center 115 can accommodate the resource request. At 440, edge device 150 sends an Enhanced Jingle SESSION-INITIATE message with the resource request parameters to aggregation/core device 153, and at 435, sends a Jingle acknowledgement to PE 170(1) to indicate that the resource request is pending.

At 450, aggregation/core device 153 sends an Enhanced Jingle SESSION-INITIATE message with the resource request parameters to service node 155, and at 445, sends a Jingle acknowledgement to aggregation/core device 153 to indicate that the resource request is pending. The service node 155 analyzes the resource request, and at 454, begins Enhanced Jingle negotiations with aggregation/core device 153. At 458, an Enhanced Jingle SESSION-ACCEPT message with resource response parameters is sent from service node 155 to aggregation/core device 153. Resource response parameters may include items such as customer ID, connectivity parameters, service identifier, and the like.

Once the Enhanced Jingle SESSION-ACCEPT message is received by aggregation/core device 153, a first segment 462 of a data path to CPE 180 is created. At 466, 470, and 474, similar negotiations, acceptance, and data path segment creation processes are performed between edge device 150 and aggregation/core device 153. At 474, 478, and 482, the process continues between PE 170(1) and edge device 150. At 486, 490, and 494, the process continues between PE 170(1) and edge device 150. Once data path segment 494 is created, a complete data path exists from CPE 180 to service node 155 and service flow 498 can begin. Data path segments 462, 474, 482, and 494 are referred to collective as the data path.

The data path may be set up based on policy, cost, proximity, Service Level Agreement (SLA), uptimes, or other provisioning parameters. Some of the data path characteristics may be determined by service node 155, using a local policy database, or parameters sent by resource management device 175.

The data path may be established using, e.g., Overlay Transport Virtualization (OTV), Layer 2 VPN (L2VPN), Layer 3 VPN (L3VPN) signaling, or VRF or VLAN creation with dynamic host route injection. The data path may be established using either a static or dynamic configuration process. In the static configuration, services such as L2VPN, L3VPN, MPLS Traffic Engineering (TE) tunnels, OTV service, etc., are preconfigured and may be automatically discovered. When using the static configuration, the Enhanced Jingle SESSION-INITIATE messages can be tailored to the preconfigured service connections. In addition, the configurations for participating devices may be checked for consistency and any configuration issues can be flagged for correction.

In the dynamic configuration, the data plane is auto negotiated. Connectivity is dynamically set up between neighboring devices and tied to a given service. Policy enforcements may be executed during negotiation. Enhanced security is available because the resource requests can be authorized before setting the data path. Since the data path is not preconfigured, security holes or vulnerabilities are minimized.

In other examples, the service flow 498 can be discontinued or "torn down" by sending a Jingle SESSION-TERMINATE message by either endpoint. Once service flow 498 is established either endpoint can redefine the transport method by sending Enhanced Jingle TRANSPORT-REPLACE message.

The hop-by-hop service connection process describe in connection with FIG. 4 can be used in a variety of ways. For example, the process can be used to set up connectivity between a customer/CPE and the data center, e.g., the customer may want to set up and IP Security (IPSec) protocol suite VPN or MPLS VPN. The process may also be used to set up PE to data center connectivity, or data center to data center connectivity, e.g., OTV may be used between data centers without any of the devices in the cloud being aware of OTV mechanisms.

In sum, techniques are provided herein for sending from a client in a first network device a first session-initiate message to a second network device that is configured to provide network layer, data link layer, or associated convergence layer based service connection information in order for the second network device to accept or reject a network layer, data link layer, or associated convergence layer based service connection with the first network device. The first session-initiate message is based on a messaging and presence protocol. A session-accept message is received at the client in the first network device that is configured to accept the service connection and provide a network layer, data link layer, or associated convergence layer based service connection information in order for the first network device to establish the service connection with the second network device. The session-accept message is based on the messaging and presence protocol. In response to receiving the session-accept message, the service connection is established.

When the service connection is rejected, a further attempt to establish a service connection is made by sending from the client in the first network device a second session-initiate message to a third network device that is configured to provide network layer, data link layer, or associated convergence layer based service connection information in order for the third network device to accept or reject a service connection with the first network device.

A data path may be created in order to establish the service connection, prior to sending the session-accept message from the second network device. A modified Jingle extension of the XMPP may be used for the session-initiate and session-accept messages. The session-initiate and session-accept messages may contain service connection parameters comprising one or more Virtual Data Center (VDC) instantiation parameters or parameters to set up a VPN.

In other examples, there is an intermediate network device that provides network connectivity between the first network device and the second network device. In this case, the first session-initiate message is received at a client in the intermediate network device. The service connection information is forwarded to the second network device using a second session-initiate message. A first segment of a data path is negotiated between the second network device and the intermediate network device. Negotiations may include a multi-tiered, multi-phased, or multi-pass mechanism by which a VLAN tagging mechanism is negotiated first and then a one or more VLAN to be tagged using the tagging mechanism is negotiated second. The session-accept message is received at the client in the intermediate network device and a second segment of a data path is negotiated between the intermediate network device and the first network device. The service connection is established via the first and second segments of the data path.

The techniques described herein may provide several advantages to a service provider. First, the service flows can be created dynamically and without human involvement. Second, because the service flows are created dynamically, they tend to be more secure since they are set up "just in time". Third, the service flows allow a service provider to extend or instantiate the VDC using, e.g., VLANs within the service provider's VPN. Fourth, the VDC instantiation scales well for cloud services for both short and long lived service flows. Fifth, since connection parameters can be negotiated between endpoints, current network conditions can be accounted for. Lastly, when network conditions change, service flows can be transferred to other servicing endpoints or the transport mechanism may be changed.

The above description is intended by way of example only.

What is claimed is:

1. A method comprising:
    sending from a client in a first network device a first session-initiate message to a second network device associated with a first datacenter, the first session-initiate message comprising resource request information for services provided by a service node in the first data center in order to establish an Open System Interconnect (OSI) model network layer (L3), data link layer (L2), or associated convergence layer based service connection between the first network device and the service node in the first data center, wherein the first session-initiate message is based on a messaging and presence protocol;
    receiving a session-accept message at the client comprising resource response information configured to accept the service connection on behalf of the service node and provide network layer (L3), data link layer (L2), or associated convergence layer based service connection information in order for the first network device to establish the service connection with the service node in the first data center, wherein the session-accept message is based on the messaging and presence protocol; and
    in response to receiving the session-accept message, establishing the service connection.

2. The method of claim 1, wherein sending the first session-initiate message comprises sending the session-initiate message as a part of a Jingle extension of the Extensible Messaging and Presence Protocol (XMPP).

3. The method of claim 1, wherein receiving the session-accept message comprises receiving the session-accept message as a part of a Jingle extension of the Extensible Messaging and Presence Protocol (XMPP).

4. The method of claim 1, further comprising negotiating between the first and second network devices parameters for the service connection using the messaging and presence protocol.

5. The method of claim 4, wherein negotiating comprises first negotiating a virtual local area network tagging mechanism and second negotiating one or more virtual local area networks to be tagged using the tagging mechanism.

6. The method of claim 1, further comprising generating the first session-initiate message with service connection parameters comprising one or more Virtual Data Center (VDC) instantiation parameters.

7. The method of claim 1, wherein receiving comprises receiving the session-accept message comprising one or more service connection path parameters.

8. The method of claim 1, wherein the service connection is a Virtual Private Network connection.

9. The method of claim 1, further comprising creating a network layer (L3), data link layer (L2), or associated convergence layer data path between the first network device and the service node in the first data center prior to establishing the service connection.

10. The method of claim 1, wherein receiving comprises receiving a message configured to reject another service connection, and further comprising sending from the client in the first network device a second session-initiate message to a third network device associated with a second datacenter, the second session-initiate message comprising resource request information for services provided by a service node in the second data center in order to establish the another network layer (L3), data link layer (L2), or associated convergence layer based service connection between the first network device and the service node in the second data center.

11. The method of claim 1, wherein an intermediate network device provides network connectivity between the first network device and the second network device, and further comprising:
    receiving the first session-initiate message at a client in the intermediate network device;
    forwarding the service connection information to the second network device using a second session-initiate message;
    negotiating a first segment of a data path between the second network device and the intermediate network device using the messaging and presence protocol;
    receiving the session-accept message at the client in the intermediate network device;
    negotiating a second segment of a data path between the intermediate network device and the first network device using the messaging and presence protocol; and
    establishing the service connection via the first and second segments of the data path.

12. An apparatus comprising:
    a network interface configured to communicate over a network; and
    a processor configured to:
    send a first session-initiate message to a first network device associated with a first datacenter, the session-initiate message comprising resource request information for services provided by a service node in the first data center to the client in order to establish an Open System Interconnect (OSI) model network layer (L3), data link layer (L2), or associated convergence layer based service connection between the first network device and the service node in the first data center, wherein the first session-initiate message is based on a messaging and presence protocol;
    receive a session-accept message comprising resource response information that is configured to accept the service connection on behalf of the service node and provide network layer (L3), data link layer (L2), or associated convergence layer based service connection information in order to establish the service connection with the service node in the first data center, wherein the session-accept message is based on the messaging and presence protocol; and
    in response to receiving the session-accept message, establishing the service connection via the network interface.

13. The apparatus of claim 12, wherein the processor is further configured to negotiate parameters for the service connection with the first network device using the messaging and presence protocol.

14. The apparatus of claim 13, wherein the processor is configured to first negotiate a virtual local area network tagging mechanism and to second negotiate one or more virtual local area networks to be tagged using the tagging mechanism.

15. The apparatus of claim 12, wherein the processor is further configured to create a network layer (L3), data link layer (L2), or associated convergence layer data path between the first network device and the service node in the first data center prior to establishing the service connection.

16. The apparatus of claim 12, wherein the processor is configured to receive a message configured to reject another service connection, and wherein the processor is further configured to send a second session-initiate message to a second network device associated with a second datacenter, the second session-initiate message comprising resource request information for services provided by a service node in the second data center in order to establish the another network layer (L3), data link layer (L2), or associated convergence layer based service connection with the service node in the second data center.

17. One or more non-transitory computer readable media storing instructions that, when executed by a processor, cause the processor to:
   send a first session-initiate message to a first network device associated with a first datacenter, the session-initiate message comprising resource request information for services provided by a service node in the first data center to the client in order to establish an Open System Interconnect (OSI) model network layer (L3), data link layer (L2), or associated convergence layer based service connection between the first network device and the service node in the first data center, wherein the first session-initiate message is based on a messaging and presence protocol;
   receive a session-accept message comprising resource response information that is configured to accept the service connection on behalf of the service node and provide network layer (L3), data link layer (L2), or associated convergence layer based service connection information in order to establish the service connection with the service node in the first data center, wherein the session-accept message is based on the messaging and presence protocol; and
   in response to receiving the session-accept message, establishing the service connection via the network interface.

18. The non-transitory computer readable media of claim 17, further comprising instructions that, when executed by the processor, cause the processor to negotiate parameters for the service connection with the first network device using the messaging and presence protocol.

19. The non-transitory computer readable media of claim 18, wherein the instructions that cause the processor to negotiate comprise instructions that, when executed by the processor, cause the processor to first negotiate a virtual local area network tagging mechanism and to second negotiate one or more virtual local area networks to be tagged using the tagging mechanism.

20. The non-transitory computer readable media of claim 17, further comprising instructions that, when executed by the processor, cause the processor to create a network layer (L3), data link layer (L2), or associated convergence layer data path between the first network device and the service node in the first data center prior to establishing the service connection.

21. The non-transitory computer readable media of claim 17, wherein the instructions that cause the processor to receive bandwidth comprise instructions that, when executed by the processor, cause the processor to receive a message configured to reject another service connection, and further comprising instructions that, when executed by the processor, cause the processor to send a second session-initiate message to a second network device associated with a second datacenter, the second session-initiate message comprising resource request information for services provided by a service node in the second data center in order to establish the another network layer (L3), data link layer (L2), or associated convergence layer based service connection with the service node in the second data center.

* * * * *